United States Patent
Foege

(10) Patent No.: US 9,175,603 B1
(45) Date of Patent: Nov. 3, 2015

(54) VARIABLE COMPRESSION RATIO ENGINE AND METHOD OF OPERATION

(71) Applicant: Electro-Motive Diesel, Inc., Lagrange, IL (US)

(72) Inventor: Aaron Gamache Foege, Westmont, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 0 days.

(21) Appl. No.: 14/306,703

(22) Filed: Jun. 17, 2014

(51) Int. Cl.
  *F02B 75/32* (2006.01)
  *F02B 75/04* (2006.01)
  *F02D 19/06* (2006.01)

(52) U.S. Cl.
  CPC ........... *F02B 75/044* (2013.01); *F02D 19/0613* (2013.01)

(58) Field of Classification Search
  CPC ... F02B 75/044; F02D 15/02; F02D 41/0025; F02D 41/0027; F02D 19/00; F02D 19/02; F02D 19/06; F02D 19/0613
  USPC ........................ 123/48 B, 78 B, 78 BA, 575
  See application file for complete search history.

(56) References Cited

U.S. PATENT DOCUMENTS

| | | | | |
|---|---|---|---|---|
| 2,989,954 A | * | 6/1961 | Hulbert | 123/48 B |
| 3,303,831 A | * | 2/1967 | Sherman | 123/48 B |
| 3,417,739 A | | 12/1968 | Fryer | |
| 3,450,111 A | | 6/1969 | Cronstedt | |
| 3,777,724 A | | 12/1973 | Kiley | |
| 3,934,560 A | | 1/1976 | Dodd | |
| 3,938,480 A | * | 2/1976 | Yanda | 123/43 B |
| 4,463,710 A | * | 8/1984 | McWhorter | 123/48 B |
| 5,178,103 A | | 1/1993 | Simko | |
| 5,195,469 A | * | 3/1993 | Syed | 123/48 A |
| 2011/0023844 A1 | | 2/2011 | Heilenbach et al. | |

* cited by examiner

*Primary Examiner* — Marguerite McMahon
(74) *Attorney, Agent, or Firm* — Liell & McNeil Attorneys, PC

(57) ABSTRACT

An internal combustion engine includes a piston assembly with a piston rotatably connected to a pin carrier. The piston can rotate about a cylinder axis from a low compression ratio orientation to a high compression ratio orientation when an electronically controlled pump of a compression ratio controlled fluid circuit is activated. The piston includes a plurality of first wedges in contact with a plurality of respective second wedges of the pin carrier in a hydraulic chamber. The first wedges have hydraulic surfaces exposed to fluid pressure in the hydraulic chamber in order to hydraulically rotate the piston relative to the pin carrier. The engine may be configured to burn diesel fuel and natural gas.

20 Claims, 2 Drawing Sheets

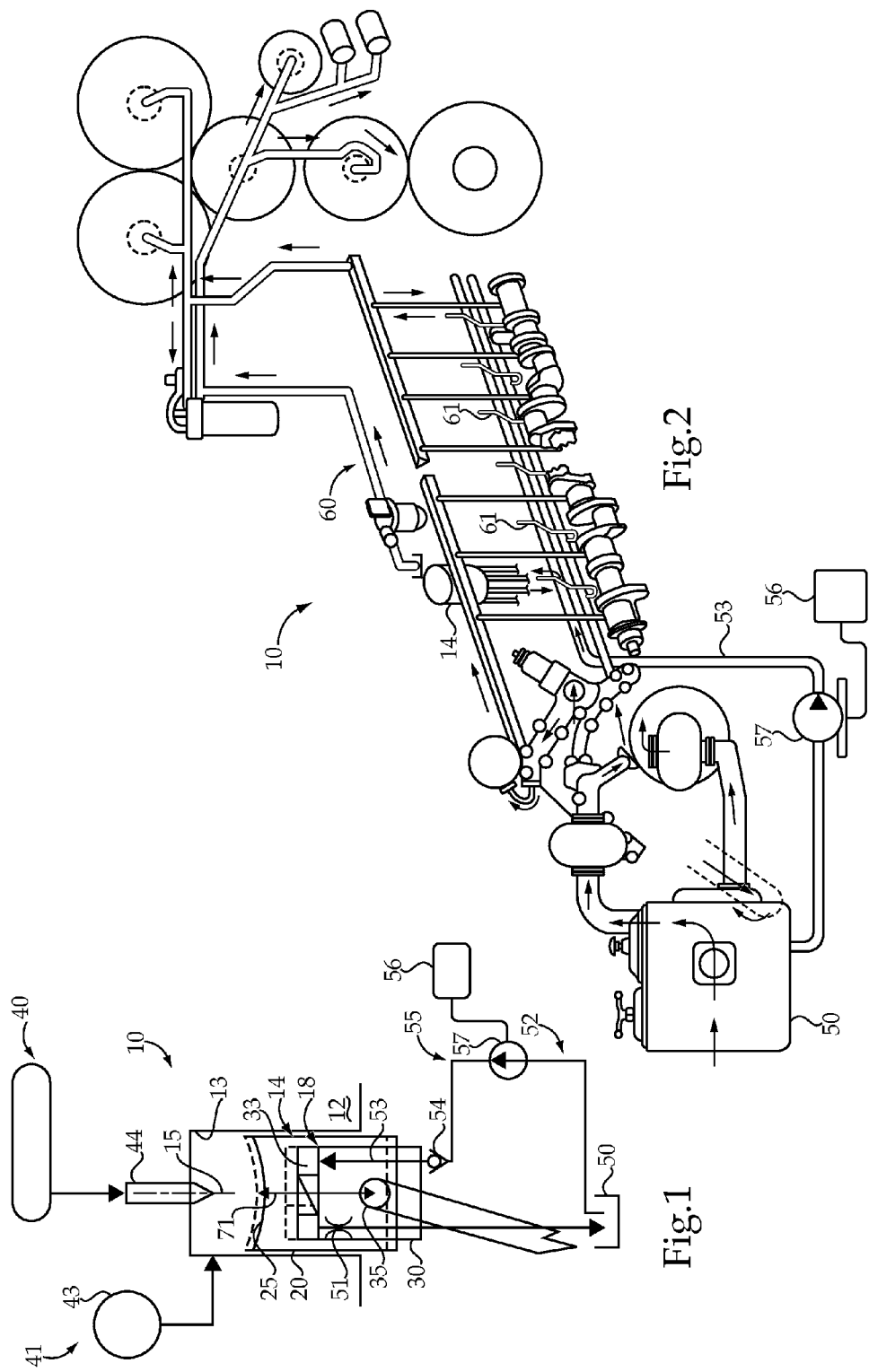

VARIABLE COMPRESSION RATIO ENGINE AND METHOD OF OPERATION

TECHNICAL FIELD

The present disclosure relates generally to internal combustion engines, and more particularly to a piston assembly that changes length through rotation to change the compression ratio of the engine.

BACKGROUND

Engine manufacturers are adapting to the new abundance of natural gas by contemplating engines that can operate utilizing primarily natural gas or primarily distillate diesel fuel, or both. In general, natural gas engines have advantageously been constructed with lower compression ratios than their counterpart diesel engines. A dual fuel engine with a fixed compression ratio may inherently operate less than optimally for at least one of the gaseous or liquid fuels. U.S. Pat. No. 3,417,739 is of interest for teaching a variable compression ratio piston assembly in which a variable volume fluid chamber is defined between a pin carrier and the piston. Changing the volume of fluid in the variable volume chamber changes the distance between the centerline of the pin and the burn surface of the piston, thus changing the compression ratio of the engine.

The present disclosure as directed toward one or more of the problems set forth above.

SUMMARY OF THE DISCLOSURE

In one aspect, an internal combustion engine includes a housing that defines a plurality of cylinders. A piston assembly is positioned to reciprocate in each of the cylinders along a cylinder axis to define a compression ratio, and the piston assembly includes a piston rotatably connected to a pin carrier to rotate about the cylinder axis. The piston has a plurality of first wedges respectively contacting a plurality of second wedges of the pin carrier in a hydraulic chamber. Each of the first wedges has a hydraulic surface exposed to fluid pressure in the hydraulic chamber. The piston rotates from a low compression ratio orientation with respect to the piston carrier to a high compression ratio orientation responsive to an active fluid pressure in the hydraulic chamber. The piston rotates from the high compression ratio orientation to the low compression ratio orientation responsive to a passive fluid pressure, which is less than the active fluid pressure, in the hydraulic chamber. The compression ratio at the high compression ratio orientation is greater than the compression ratio at the low compression ratio orientation.

In another aspect, a method of operating the engine includes burning primarily a first fuel in the cylinders with the piston assembly at the low compression ratio orientation. Hydraulic fluid is supplied to the hydraulic chamber at the active fluid pressure to rotate the piston from the low compression ratio orientation to the high compression ratio orientation. A second fuel is primarily burned in the cylinders with the piston assembly at the high compression ratio orientation.

BRIEF DESCRIPTION OF THE DRAWINGS

FIG. 1 is a partial schematic view of an internal combustion engine according to the present disclosure;

FIG. 2 is a perspective internal view of the engine of FIG. 1;

DETAILED DESCRIPTION

Figure 3:
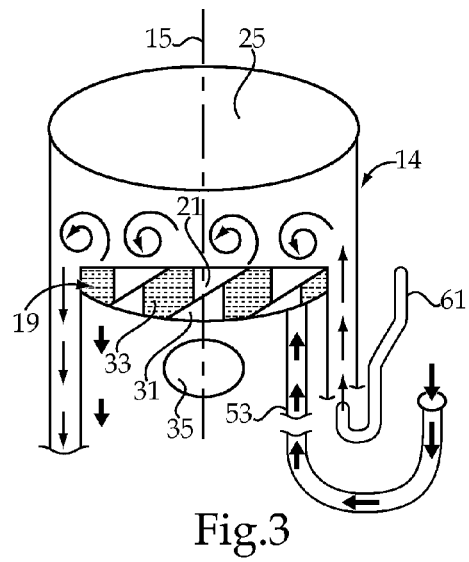
FIG. 3 is a schematic view of a piston assembly according to the present disclosure.
Figure 4:
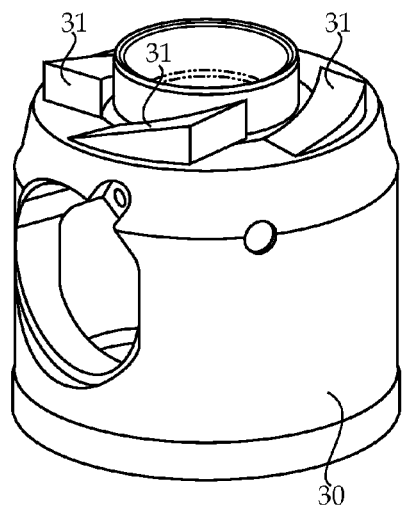
FIG. 4 is a perspective view of a pin carrier according to another aspect of the present disclosure.
Figure 5:
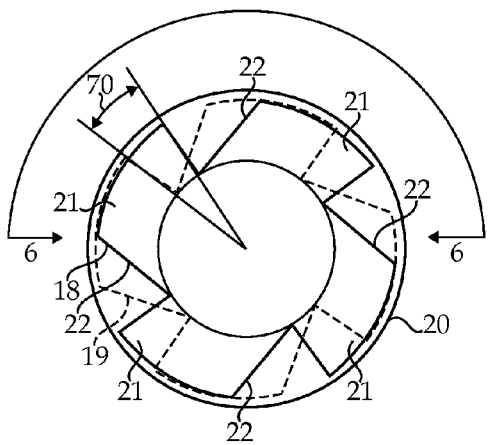
FIG. 5 is a bottom view of a piston for the piston assembly of FIGS. 1 and 3.

Referring initially to FIGS. 1 and 2, an internal combustion engine 10 includes a housing 12 that defines a plurality of cylinders 13. A piston assembly 14 is positioned to reciprocate in each of the cylinders 13 along a cylinder axis 15 between a top dead center and a bottom dead center to define a compression ratio for engine 10. The piston assembly 14 includes a piston 20 rotatably connected to a pin carrier 30 to rotate about the cylinder axis 15. Engine 10 includes a first fuel supply system 40 fluidly connected to each of the cylinders 13, and a second fuel supply system 41 also fluidly to each of the cylinders 13. The first fuel supply system 40 may be a liquid fuel supply system 44 for direct injection of liquid diesel fuel into cylinders 13 in a conventional manner. The second fuel supply system 41 may be a gaseous fuel supply system 43, that may be configured to for port injection of natural gas into cylinders 13 in a conventional manner. Thus, engine 10 may be considered a dual fuel engine capable of burning both natural gas and diesel fuels. In general, piston assembly 14 is configured to transform between a configuration that provides a low compression ratio, maybe less than 15:1 associated more with combustion of natural gas, to a configuration associated with a higher compression ratio, maybe greater than 15:1 more associated with operation of engine 10 in a pure diesel mode.

Figure 6:
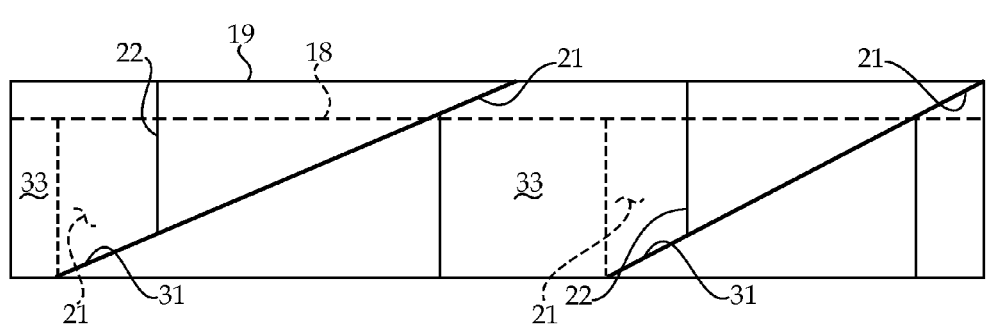
FIG. 6 is an un-rolled side view of the hydraulic chamber of the piston assembly of FIGS. 1 and 3.

Referring now in addition to FIGS. 3-6, the variable compression ratio is accomplished by the piston 20 having a plurality of first wedges 21 respectively contacting a plurality of second wedges 31 of the pin carrier 30 in a hydraulic chamber 33. Each of the first wedges 31 includes a hydraulic surface 22 exposed to fluid pressure in hydraulic chamber 33. Piston 20 rotates from a low compression ratio orientation 18 as shown in FIG. 1 with respect to piston carrier 30 to a high compression ratio orientation 19 as shown in FIG. 3 responsive to an active fluid pressure in the hydraulic chamber 33. Piston 20 rotates from the high compression ratio 19 to the low compression ratio orientation 18 responsive to a passive fluid pressure, which is less than the active fluid pressure, in the hydraulic chamber 33. As expected, the compression ratio at the high compression ratio orientation 19 is greater than the compression ratio at the low compression ratio orientation 18. FIG. 6 is of interest for showing a 180° unrolled side view of hydraulic chamber 33 with the low compression ratio orientation 18 shown with dotted lines and the high compression ratio orientation 19 shown with solid lines. As shown in this view, the hydraulic surface 22, when acted on with active fluid pressure, causes the first wedges 21 to slide along the surface of the second wedges 31 when rotating from the low compression ratio orientation 18 to the high compression ratio orientation 19. In the illustrated embodiment, both the piston 20 and the pin carrier 30 are shown as each including four wedges 21, 31. Nevertheless, those skilled in the art will appreciate that any number of wedges would also fall within the intended scope of the present disclosure.

Although not necessary, engine 10 may utilize a compression ratio control fluid circuit 55 to control fluid pressure in hydraulic chamber 33, and may utilize engine lubrication oil as the hydraulic medium. In the illustrated embodiment, the compression ratio control fluid circuit 55 is fluidly in parallel with the engine lubrication fluid circuit 60. The compression ratio control fluid circuit 55 may include an electronically controlled pump 57 that is fluidly positioned between a lubrication oil sump 50 and a supply passage 53 that opens into hydraulic chamber 33. Electronically controlled pump 57 may be activated by an operator with a simple switch or may be controlled indirectly by an electronic control module 56 that may receive on/off commands from an operator in a manner well known in the art. Electronically controlled pump 57 may have an output fluid pressure equal to or greater than an active fluid pressure necessary to cause rotation of piston 20 relative to pin carrier 30. Hydraulic chamber 33 may be fluidly connected to lubrication oil sump 50, which is at the passive fluid pressure, through a drain orifice 51 regardless of whether the piston is at the low compression ratio orientation 18 or the high compression ratio orientation 19. Thus, when electronically controlled pump 57 is off or inactive, combustion pressure acting on the top burn surface 25 of piston 20 will cause the hydraulic fluid in hydraulic chamber 33 to drain through drain orifice 51 until the piston 20 passively resumes the low compression ratio orientation 18. When the hydraulic chamber 33 is fluidly connected to a source of lubrication oil 52 at the active pressure, when electronically controlled pump 57 is on or active, the flow rate of fluid into hydraulic chamber 33 from supply passage will exceed the flow rate leaving hydraulic chamber 33 through restricted drain orifice 51, resulting in the piston 20 rotating from its low compression ratio orientation 18 to its high compression ratio orientation 19 as long as the electronically controlled pump 57 continues to operate. A check valve 54 may be positioned in supply passage 53 to prevent the back flow of fluid from hydraulic chamber 33 toward electronically controlled pump 57, such as when high combustion pressures exist during combustion events acting on top burn surface 25 of piston 20. The hydraulic chamber 33 fluid connection to the source of active fluid pressure 52 would be discontinued when the piston 20 is at its low compression ratio orientation 18.

As stated earlier, the compression ratio control fluid circuit 55 may be fluidly in parallel with the engine lubrication fluid circuit 60. Thus, regardless of whether piston 20 at its low compression orientation 18 or its high compression ratio orientation 19, the lubrication fluid circuit 60 may include piston cooling nozzles 61 positioned to continuously supply lubrication oil to cool piston 20 in a manner well known in the art.

As shown, piston 20 may include at least three wedges 21, with four wedges being shown. A rotation angle 70 between the low compression ratio orientation 18 and the high compression ratio orientation 19 may necessarily be less than 360° divided by the number of wedges of the piston. In the case of the illustrated embodiment in which the piston 20 includes four wedges 21, the rotation angle would necessarily be less than 90°, and may be substantially less, depending upon the slope angle of the wedges 21 and 31. In one specific example, the wedges 21 and 31 may be sized such that a distance 71 of the piston burn surface 25 to pin 35 that is positioned through pin carrier 30 increases by about 0.2 inches when the piston 20 rotates from the low compression ratio orientation 18 to the high compression ratio 19. In one specific example, this distance may correspond to a change in compression ratio from 14:1 to 18:1. Nevertheless, the distance 71 for a specific engine may be different and the actual compression ratio at the different orientations may differ depending upon specific circumstances for a specific engine. Although not shown, those skilled in the art will appreciate that one or both of piston 20 and piston carrier 30 may include stop surfaces that engage when the piston 20 reaches the high compression ratio orientation in order to prevent the piston 20 from rotating beyond some desired height.

INDUSTRIAL APPLICABILITY

The present disclosure relates generally to a piston assembly 14 that may be moved between a low compression ratio orientation 18 and a high compression orientation 19 so that an engine 10 may have the ability to operate with either a low compression ratio or a high compression ratio. The present disclosure finds specific applicability to dual fuel engines that have the ability to burn both natural gas and diesel advantageously at different compression ratios better associated with the two different fuels.

Referring again to the Figs., engine 10 may be operated by burning primarily gaseous fuel in the cylinders 13 with the piston 20 at the low compression ratio orientation 18. For instance, a majority of the fuel burned in each cycle may be natural gas that is ignited by compression igniting diesel fuel injected directly into the cylinders 13. In the event that the engine 10 is switched to burning primarily diesel fuel, hydraulic fluid (e.g., lubricating oil) may be supplied to the hydraulic chamber 33 at the active fluid pressure to rotate piston 20 from the low compression ratio orientation 18 to the high compression ratio orientation 19. Thereafter, the engine may operate at the higher compression ratio such as when engine 10 is operating in a pure diesel mode. Sometime thereafter, the supply of hydraulic fluid at the active pressure to the hydraulic chamber 33 may be discontinued. When this occurs, piston 20 may rotate from the high compression ratio orientation 19 to the low compression ratio orientation 18 responsive to draining lubrication oil from the hydraulic chamber 33 through drain orifice 51 to lubrication oil sump 50.

In the illustrated embodiment, the step of supplying hydraulic fluid at the active fluid pressure may be performed responsive to activating an electronically controlled pump 57. Because the drain orifice 51 may always be open, lubrication oil may continuously drain from hydraulic chamber 33 even when electronically controlled pump 57 is active and supplying hydraulic fluid to hydraulic chamber 33. In parallel with the operation of the compression ratio control fluid circuit 55, engine 10 may also cool the piston 20 with lubrication oil moved through a piston cooling nozzle 61 that is fluidly in parallel with the lubrication fluid supplied to the hydraulic chamber 33. As stated earlier, the compression ratio of engine 10 may be increased from less than 15:1 to greater than 15:1 responsive to rotation of the piston 20 from the low compression ratio orientation 18 to the high compression ratio orientation 19. This change may correspond to a change in the distance of the piston burn surface 25 to pin 35 on the order of about 0.2 inches when the piston rotates from the low compression ratio orientation 18 to the high compression ratio orientation 19. The term about, as used in this disclosure, means that the number is rounded to a single significant digit. Thus, 0.16 is about 0.2.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:
1. An internal combustion engine comprising:
a housing that defines a plurality of cylinders;

a piston assembly positioned to reciprocate in each of the cylinders along a cylinder axis to define a compression ratio, and the piston assembly includes a piston rotatably connected to a pin carrier to rotate about the cylinder axis;

the piston having a plurality of first wedges respectively contacting a plurality of second wedges of the pin carrier in a hydraulic chamber, and each of the first wedges having a hydraulic surface exposed to fluid pressure in the hydraulic chamber;

the piston rotating from a low compression ratio orientation with respect to the piston carrier to a high compression ratio orientation responsive to an active fluid pressure in the hydraulic chamber;

the piston rotating from the high compression ratio orientation to the low compression ratio orientation responsive to a passive fluid pressure, which is less than the active fluid pressure, in the hydraulic chamber; and the compression ratio at the high compression ratio orientation being greater than the compression ratio at the low compression ratio orientation.

2. The engine of claim 1 including a first fuel supply system fluidly connected to each of the cylinders; and a second fuel supply system fluidly connected to each of the cylinders.

3. The engine of claim 1 wherein the hydraulic chamber is fluidly connected to a lubrication oil sump at the passive fluid pressure through a drain orifice when the piston is at the low compression ratio orientation and the high compression ratio orientation;

the hydraulic chamber being fluidly connected to a source of lubrication oil at the active fluid pressure through a supply passage when the piston is at the high compression ratio orientation; and the hydraulic chamber fluid connection to the source of active fluid pressure being discontinued when the piston is at the low compression ratio orientation.

4. The engine of claim 3 wherein the drain orifice and the supply passage are portions of a compression ratio control fluid circuit fluidly in parallel with an engine lubrication fluid circuit.

5. The engine of claim 4 including an electronically controlled pump fluidly positioned between the lubrication oil sump and the supply passage.

6. The engine of claim 5 wherein the lubrication fluid circuit includes a piston cooling nozzle positioned to supply lubrication oil to cool the piston.

7. The engine of claim 6 including a gaseous fuel supply system fluidly connected to each of the cylinders; and a liquid fuel supply system fluidly connected to each of the cylinders.

8. The engine of claim 1 wherein the piston includes at least three wedges; and a rotation angle between the low compression ratio orientation and the high compression ratio orientation is less than 360 degrees divided by a number of wedges of the piston.

9. The engine of claim 1 wherein a distance of a piston burn surface to a pin through the pin carrier increases by about 0.2 inches when the piston rotates from the low compression ratio orientation to the high compression ratio orientation.

10. The engine of claim 1 wherein the compression ratio is less than 15:1 when the piston is at the low compression ratio orientation; and the compression ratio is greater than 15:1 when the piston is at the high compression ratio orientation.

11. A method of operating an internal combustion engine that includes a housing that defines a plurality of cylinders; a piston assembly positioned to reciprocate in each of the cylinders along a cylinder axis to define a compression ratio, and the piston assembly includes a piston rotatably connected to a pin carrier to rotate about the cylinder axis; the piston having a plurality of first wedges respectively contacting a plurality of second wedges of the pin carrier in a hydraulic chamber, and each of the first wedges having a hydraulic surface exposed to fluid pressure in the hydraulic chamber; the piston rotating from a low compression ratio orientation with respect to the piston carrier to a high compression ratio orientation responsive to an active fluid pressure in the hydraulic chamber; the piston rotating from the high compression ratio orientation to the low compression ratio orientation responsive to a passive fluid pressure, which is less than the active fluid pressure, in the hydraulic chamber; and the compression ratio at the high compression ratio orientation being greater than the compression ratio at the low compression ratio orientation, the method comprising the steps of:

burning primarily a first fuel in the cylinders with the piston assembly at the low compression ratio orientation; and supplying hydraulic fluid to the hydraulic chamber at the active fluid pressure to rotate the piston from the low compression ratio orientation to the high compression ratio orientation; and burning primarily a second fuel in the cylinders with the piston assembly at the high compression ratio orientation.

12. The method of claim 11 including a step of discontinuing the supply of hydraulic fluid at the active pressure; and rotating the piston from the high compression ratio orientation to the low compression ratio orientation responsive to draining lubrication oil from the hydraulic chamber through a drain orifice to a lubrication oil sump.

13. The method of claim 11 wherein the supplying step is performed responsive to activating an electronically controlled pump.

14. The method of claim 11 including a step of draining lubrication oil from the hydraulic chamber through a drain orifice to a lubrication oil sump during the supplying step.

15. The method of claim 11 including a step of cooling the piston with lubrication oil moved through a piston cooling nozzle in parallel with the lubrication fluid supplied to the hydraulic chamber.

16. The method of claim 15 wherein the compression ratio is increased from less than 15:1 to greater than 15:1 responsive to rotation of the piston from the low compression ratio orientation to the high compression ratio orientation.

17. The method of claim 16 wherein a distance of a piston burn surface to a pin through the pin carrier increases by about 0.2 inches when the piston rotates from the low compression ratio orientation to the high compression ratio orientation.

18. The method of claim 17 wherein a rotation angle between the low compression ratio orientation and the high compression ratio orientation is less than 360 degrees divided by a number of wedges of the piston.

19. The method of claim 11 wherein the first fuel is natural gas, and the second fuel is diesel fuel.

20. The method of claim 19 including a step of discontinuing the supply of hydraulic fluid at the active pressure; and rotating the piston from the high compression ratio orientation to the low compression ratio orientation responsive to draining lubrication oil from the hydraulic chamber through a drain orifice to a lubrication oil sump;

wherein the supplying step is performed responsive to activating an electronically controlled pump;

draining lubrication oil from the hydraulic chamber through a drain orifice to a lubrication oil sump during the supplying step; and cooling the piston with lubrication oil moved through a piston cooling nozzle in parallel with the lubrication fluid supplied to the hydraulic chamber.

\* \* \* \* \*